(12) United States Patent
Vantrease et al.

(10) Patent No.: US 8,662,573 B2
(45) Date of Patent: Mar. 4, 2014

(54) LATERAL IMPACT ENERGY TRANSFER RAIL

(75) Inventors: Steven B. Vantrease, Ann Arbor, MI (US); Tyler E. Schnug, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/401,170

(22) Filed: Feb. 21, 2012

(65) Prior Publication Data

US 2013/0214559 A1 Aug. 22, 2013

(51) Int. Cl.
*B62D 25/06* (2006.01)

(52) U.S. Cl.
USPC ................. 296/203.03; 296/210

(58) Field of Classification Search
USPC .......... 296/203.01, 203.03, 187.12, 210, 296/185.1, 104
See application file for complete search history.

(56) References Cited

U.S. PATENT DOCUMENTS

| | | | |
|---|---|---|---|
| 4,248,475 A * | 2/1981 | Johnsen | 296/100.17 |
| 4,652,045 A | 3/1987 | Hanley et al. | |
| 5,104,178 A | 4/1992 | Bienert | |
| 5,671,968 A * | 9/1997 | Masuda et al. | 296/187.12 |
| 5,681,076 A * | 10/1997 | Yoshii | 296/210 |
| 6,312,047 B1 | 11/2001 | Tsuruo et al. | |
| 6,435,605 B2 | 8/2002 | Tsuruo et al. | |
| 6,923,501 B2 | 8/2005 | Sugiura | |
| 7,210,727 B2 * | 5/2007 | Stephenson | 296/104 |
| 7,213,874 B2 * | 5/2007 | Osterberg et al. | 296/210 |
| 7,407,222 B2 | 8/2008 | Anderson et al. | |
| 7,441,833 B1 | 10/2008 | Pomeroy et al. | |
| 7,677,652 B2 | 3/2010 | Mollick et al. | |
| 7,758,109 B2 | 7/2010 | Reed et al. | |
| 8,042,863 B2 * | 10/2011 | Nydam | 296/210 |

FOREIGN PATENT DOCUMENTS

| | | |
|---|---|---|
| JP | 2000-062646 | 2/2000 |
| JP | 2006-193037 | 7/2006 |
| JP | 2006-312403 | 11/2006 |
| JP | 2006-327284 | 12/2006 |
| JP | 2007-083830 | 4/2007 |
| JP | 2007-230408 | 9/2007 |
| JP | 2008-201195 | 9/2008 |
| JP | 2009-56855 | * 3/2009 |
| JP | 2009-262662 | 11/2009 |
| JP | 4483680 | 4/2010 |
| JP | 2010-115961 | 5/2010 |
| JP | 2010-173415 | 8/2010 |
| KR | 2001-0055037 | 12/1999 |
| NL | 1011184 | 2/1999 |

* cited by examiner

*Primary Examiner* — Dennis Pedder
(74) *Attorney, Agent, or Firm* — Brinks Gilson & Lione

(57) ABSTRACT

A lateral impact energy transfer rail for an automotive vehicle and a body structure incorporating the same. The transfer rail includes a cross member having a gusset mounted at each end. The gussets opposing end of each gusset is attached to a roof side rail of the vehicle. The gussets are secured to the cross member by a fastener and an additional connection. The additional connection is laterally offset from the fastener.

16 Claims, 8 Drawing Sheets

LATERAL IMPACT ENERGY TRANSFER RAIL

BACKGROUND

1. Field of the Invention

The present invention generally relates to the reinforcement of the body structure of an automotive vehicle. More specifically, the invention relates to a body structure designed to transfer energy during a lateral side impact.

2. Description of Related Art

Automotive vehicle bodies are designed with a variety of structures that provide strength and rigidity to the vehicle in the event of a side impact to the vehicle. The underlying structure is generally a series of rails built from sheet metal components and onto which body panels are welded.

In the roof structure of a vehicle, a cross rail is typically provided beneath the roof panel to both support the roof panel and provide lateral support. The cross rail is generally positioned at a point near or coinciding with the B-pillars of the body framework, whether that body framework is a uni-body construction or a frame on chassis construction. The B-pillars are generally upright support structures connected to the side roof rails, the latter of which extend longitudinally relative to the vehicle. Provided at a location between the front and rear side windows, the B-pillars are generally located behind the front doors of the vehicles.

When a vehicle is impacted from the side, the cross rail transfers the energy of the impact from the body structure on the side of impact to the body structure on the opposing side of the vehicle. By efficiently transferring this energy, the rigidity and strength of the framework on the impacted side of the vehicle is further improved so as to resist and accommodate the impact.

As previously mentioned, in the vehicle roof structure, a cross rail is provided to transfer this side impact. For this reason, the cross rail may also referred to as the transfer rail. While the cross rail can be provided in a variety of constructions, in one construction of the cross rail, a center cross member is provided with a pair of gussets, one gusset located on each end of the cross member. The inboard end of the gussets overlie a portion of the cross member and are secured thereto by a series of threaded fasteners or spot welds. The opposing end, the outboard end of the gusset, is secured to a side roof rail by threaded fasteners or spot welds.

In order to accommodate a side curtain airbag of the vehicle, the gusset includes a curved portion between its ends; the curved portion extends up and over the side curtain airbag. As a result of a side impact to the vehicle, the inboard end of gusset on the side of the vehicle opposite from the impact, could potentially separate or peel apart from the cross member of the cross rail.

SUMMARY

In overcoming the enumerated drawbacks and other limitations, the present invention provides an improved structural member for absorbing and/or transferring side impact energy within an impacted vehicle during a lateral collision.

In accordance with one aspect of the invention, a side impact energy transfer rail for an automotive vehicle is provided. The transfer rail includes a center cross member having a pair of opposing ends. A gusset is mounted to each of the ends of the cross member, and the gussets each have a first gusset end attached to the cross member and a second gusset end configured to be attached to a roof side rail of the vehicle. Each of the gussets is secured to the cross member by a series of fasteners and an additional connection that is off-set in a lateral direction from the fasteners.

In accordance with another aspect of the invention, a body structure for an automotive vehicle is provided. The body structure includes a pair of roof side rail members that are located adjacent to the roof of the vehicle and extend longitudinally relative to the vehicle. Pillar members are connected to the roof side rail members and extend downwardly from the roof side rail member relative to the vehicle. A transfer rail extends laterally between the roof side rail members and includes a center cross member having a gusset attached to each end thereof. While one end of the gusset is attached to the cross member, the other end of the gusset is attached to one of the roof side rails. Each of the gussets is secured to the cross member by a series of fasteners and an additional connection, the additional connection being off-set in a lateral direction from the fasteners.

In a further aspect of the invention, the additional connection is a tab connection between the gusset and the cross member, which includes a tab and a tab insert. The tab is integrally formed with either the cross member or the gusset and includes a displaced portion and a transition portion. The displaced portion is spaced apart from the body of the cross member or gusset and is connected to the body by the transition portion. The tab insert is integrally formed with the other of the cross member and the gusset. To form the additional connection, the tab insert is received in the space located between the tab and the body of the cross member or the gusset.

In another aspect of the invention, the tab is unitarily formed in the cross member or the gusset, and the tab insert is unitarily formed in the other of the cross member or the gusset.

In a yet another aspect of the invention, the tab is formed in the cross member and the tab insert is formed in the gusset.

In an additional aspect of the invention, the tab is formed with the cross member and the tab insert is formed with the gusset.

In still a further aspect of the invention, the tab connection is spaced apart from the series of fasteners in a longitudinal direction of the cross member.

In yet another aspect of the invention, the tab defines an insertion opening through which the tab insert extends, the insertion opening being oriented in a direction facing the other of the cross member or the gusset.

In still an additional aspect of the invention, the fasteners are threaded fasteners.

In yet an additional aspect of the invention, the fasteners are spot welds.

Further objects, features and advantages of this invention will become readily apparent to persons skilled in the art after a review of the following description, with reference to the drawings and claims that are appended to and form a part of this specification.

DETAILED DESCRIPTION

Figure 1:
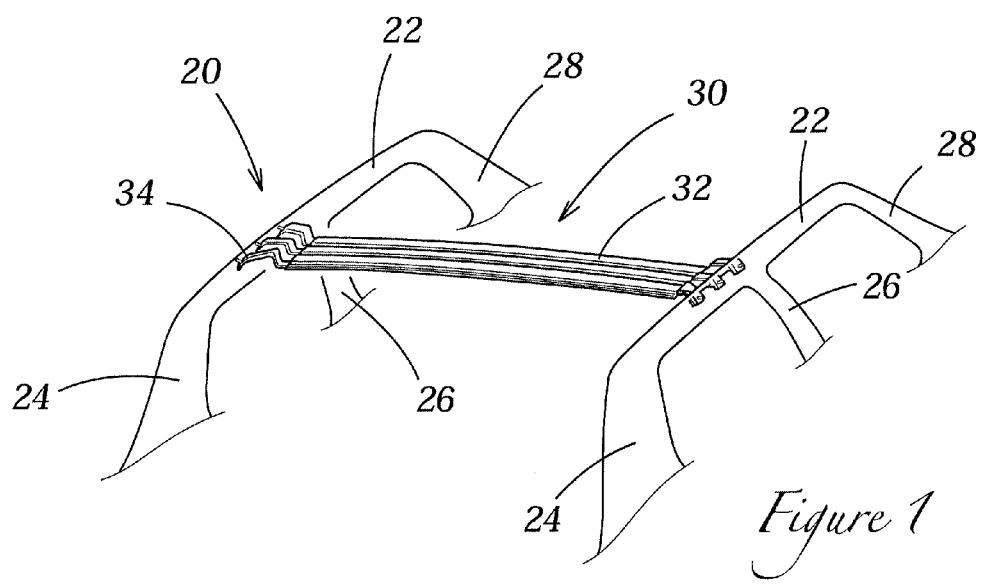
FIG. 1 is perspective view of a lateral impact, energy transfer rail in accordance with the teachings of the present invention.

Referring now to the drawings, a body structure for an automotive vehicle and embodying the principles of the present invention is illustrated therein and designated at 20. As its primary components, the body structure 20 includes a pair of side roof rails 22, various pillars and a side impact, load transfer rail 30.

The various pillars are connected to the side roof rails and extend downwardly therefrom to support the roof. These pillars are generally referred to as the C-pillar 24, the B-pillar 26 and the A-pillar 28. The A-pillar 28 is located toward the forward end of the vehicle, generally between the front windshield and the front side windows. The B-pillar 26 is located generally between the front and rear side windows of the vehicle. Finally, the C-pillar 24 is located between the rear side windows and the rear window of the vehicle.

Extending between the side roof rails 22, generally in the vicinity of the B-pillars 26, is the side impact, load transfer rail 30. The transfer rail 30 is secured to the side roof rails 22 at its ends, by threaded fasteners, spot welds or other means, and, as such, the longitudinal length of the transfer rail 30 is generally transverse to the longitudinal axis of the vehicle.

As used herein, directional references (such as inward, inboard, outward, outboard, upward, forward, rearward, etc.) are in relation to the positioning of the components when incorporated into an automotive vehicle. As such, the forward direction is generally towards the front of the vehicle; the inboard or inward direction is generally towards the center line of the vehicle; the outboard or outward direction is generally away from the center line of the vehicle; the upward direction is generally toward the roof of the vehicle; the downward direction is generally toward the ground upon which the vehicle rests; and the rearward direction is generally towards the rear of the vehicle.

Figure 2:
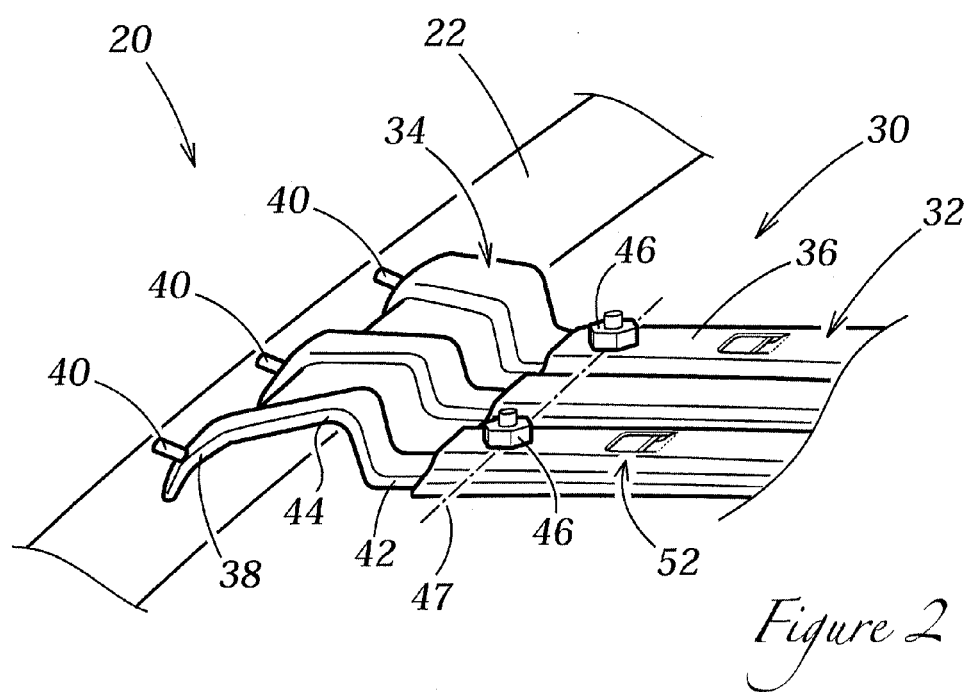
FIG. 2 is an enlarged view of an end portion of the transfer rail seen in FIG. 1.

The transfer rail 30 further includes a center cross member 32 and a pair of gussets 34. At least on their inboard ends, the gussets 34 have a cross sectional shape that corresponds with the cross sectional shape of the cross member 32 thereby allowing the gussets 34 to matingly engage the cross member 32 at opposing ends 36 of the cross member 32. As seen in FIG. 2, the cross member 32 and the gussets 34 are provided with what is herein referred to as a corrugated or wavy cross sectional shape.

The gussets 34 are provided with an outboard end that is secured to the side roof rail 22 by the previously mentioned threaded fasteners 40, spot welds or other means. At their inboard ends 42, the gussets 34 are secured to the cross member 32. Between the outboard ends 38 and inboard ends 42, the gussets 34 exhibit a curved intermediate portion 44. This intermediate portion 44 allows for the transfer rail 30 to accommodate a side curtain airbag (not shown), when such a device is provided in the vehicle.

Figure 3:
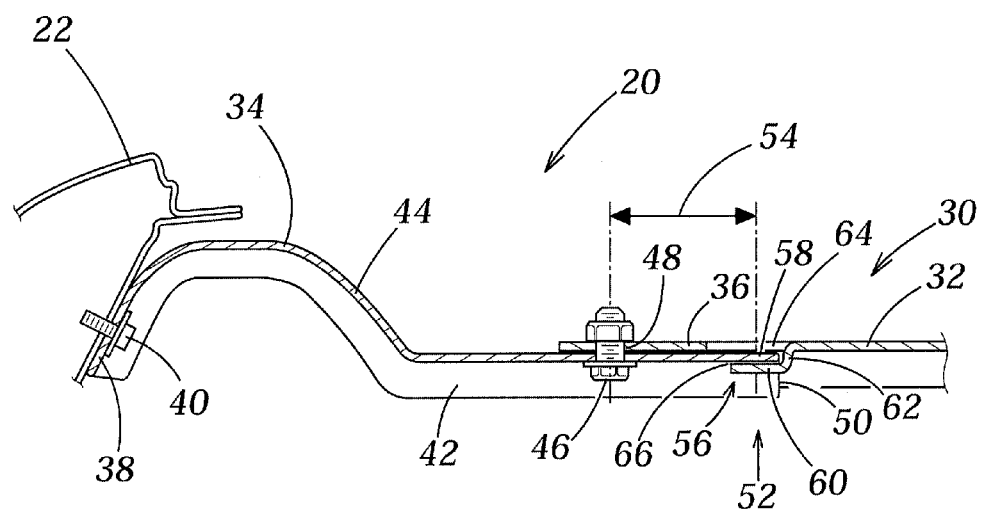
FIG. 3 is cross-sectional view generally taken along line 3-3 in FIG. 2.

To secure the inboard ends 42 of the gussets 34 to the ends 36 of the cross member 32, a plurality or series of fasteners 46 are utilized. As seen in FIGS. 2 and 3, the fasteners 46 are illustrated as the threaded fasteners extending through corresponding bores 48 formed through both the cross member 32 and the gussets 34. As an alternative to the threaded fasteners 46, the fasteners 46 could be spot welds applied in the same location. Obviously, in the construction utilizing spot welds, the bores 48 would be omitted in the gussets 34 and the cross member 32.

Figure 4:
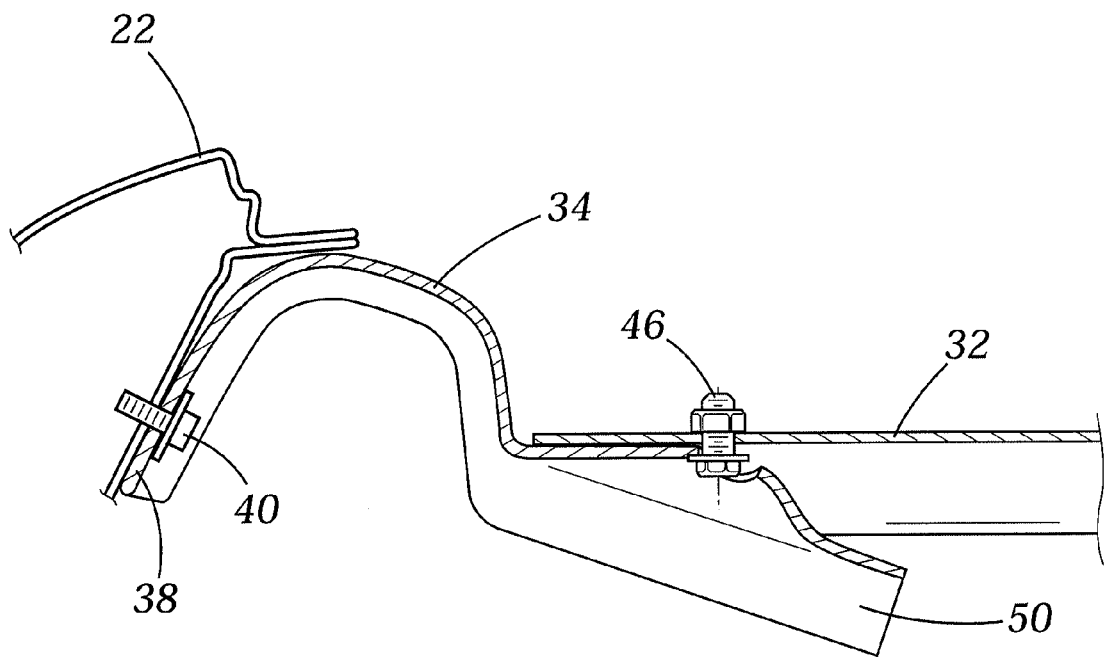
FIG. 4 is a cross-sectional view of an end portion of a transfer rail after a side impact and without incorporating the teachings of the present invention.

As seen in FIGS. 2 and 3, the fasteners 46 are aligned with one another along a fastener axis 47 that is generally parallel to the longitudinal axis of the vehicle. During a side impact, this may result in the forming of a bending moment about the fasteners 46. The formation of this bending moment may in turn cause the terminal end 50 of the gussets 34 to peel or pull away from the cross member 32, as is generally illustrated in FIG. 4. To prevent the terminal end 50 of the gusset 34 from potentially pulling away from the cross member 32 during a side impact, one or more additional connections are provided between the gussets 34 and the cross member 32.

The additional connections 52 are provided in the inboard end 42 of the gussets 34, at or immediately adjacent to the terminal end 50 of the gussets 34. With this positioning of the additional connections 52, it is seen that the connections made thereby are laterally offset from the axis 47 along which the fasteners 46 are positioned. This offset, generally designated at 54 in FIG. 3, is accordingly directed along the longitudinal length of the cross member 32.

The additional connections 52 can be provided in various different constructions. As seen in FIGS. 2 and 3, the additional connections 52 are provided as tab connections. Alternatively, the additional connections could be provided by way a threaded fastener, either as a bolt and nut variety (similar to fastener 46) or a screw fastener (not shown). As a further alternative, the additional connections 52 may also be provided by way of spot welds. Furthermore, while two additional connections 52 are illustrated in FIG. 2, more than two or only one additional connection 52 could be employed.

Referring now specifically to the tab connection 52 seen in FIGS. 2 and 3, the tab connection 52 includes a tab 56 and a tab insert 58, each of which is respectively formed on one or the other of the cross member 32 and the gusset 34. The tab 56 is formed by stamping or punching out a portion of the part within which it is formed (either the cross member 32 or the gusset 34) and as such includes a displaced portion 60 and a transition portion 62. In the illustrated drawings, the tab 56 is formed in the cross member 32. As seen in FIG. 3, the displaced portion 60 is spaced apart from the adjacent body portion and the opening 64 in the cross member 32 from which it was formed. This spacing is maintained by the transition portion 62, which connects the displaced portion 60 to the body portion of the cross member 32. As such, the displaced portion 60 forms an insertion opening 66 that is generally oriented or open in a direction towards the structural component defining the tab insert 58. In the illustrated embodiment, the insertion opening 66 is generally open in the direction towards the gusset 34. While illustrated as facing in the direction of the gusset 34, the insertion opening 66 of the tab 56 could be oriented and open in other directions or the tab itself could be received within a slot or opening formed in the other structural component.

The tab insert 58 is defined by portions of the terminal end 50 of the gusset and is received through the insertion opening 66 into the space between the displaced portion 60 and the adjacent portions of the cross member 32. The providing of the displaced portion 60 limits the ability of tab insert 58, and therefore the terminal end 50 of the gussets 34, from being freely displaced away from the cross member 32 during a side impact. The displaced portion 60 thereby retains the tab insert 58 and the terminal end 50 of the gusset 34 adjacent to the cross member 32 and prevents the peeling effect seen in FIG. 4.

Figure 8:
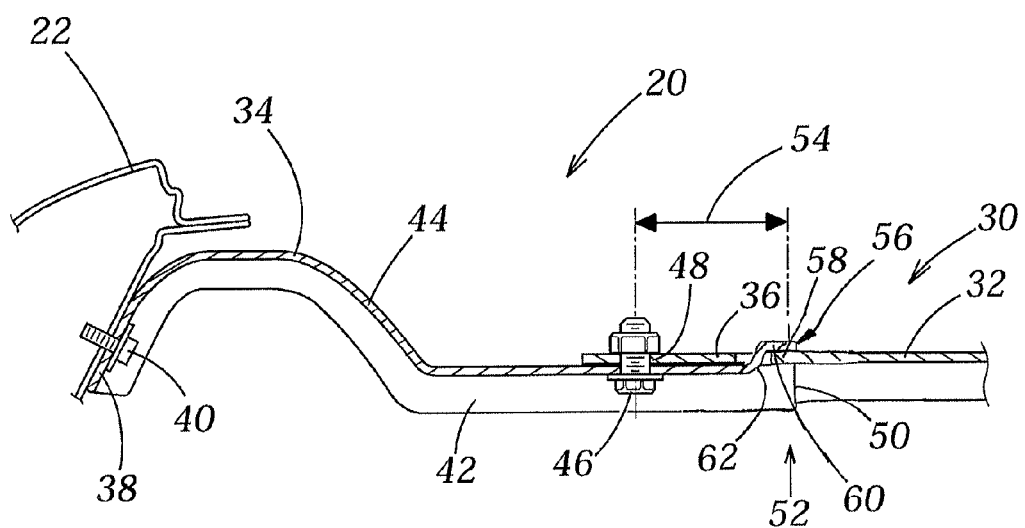
FIG. 8 is a cross-sectional view of an alternate construction according to the principles of the present invention.

While the illustrated embodiment shows the tabs 56 being formed as part of the cross member and the tab inserts 58 being formed as part of the gussets, it will be readily apparent that the construction could be reversed, with the tab being formed as part of the gussets and the tab insert being formed as part of the cross member, as seen in FIG. 8.

Figure 5:
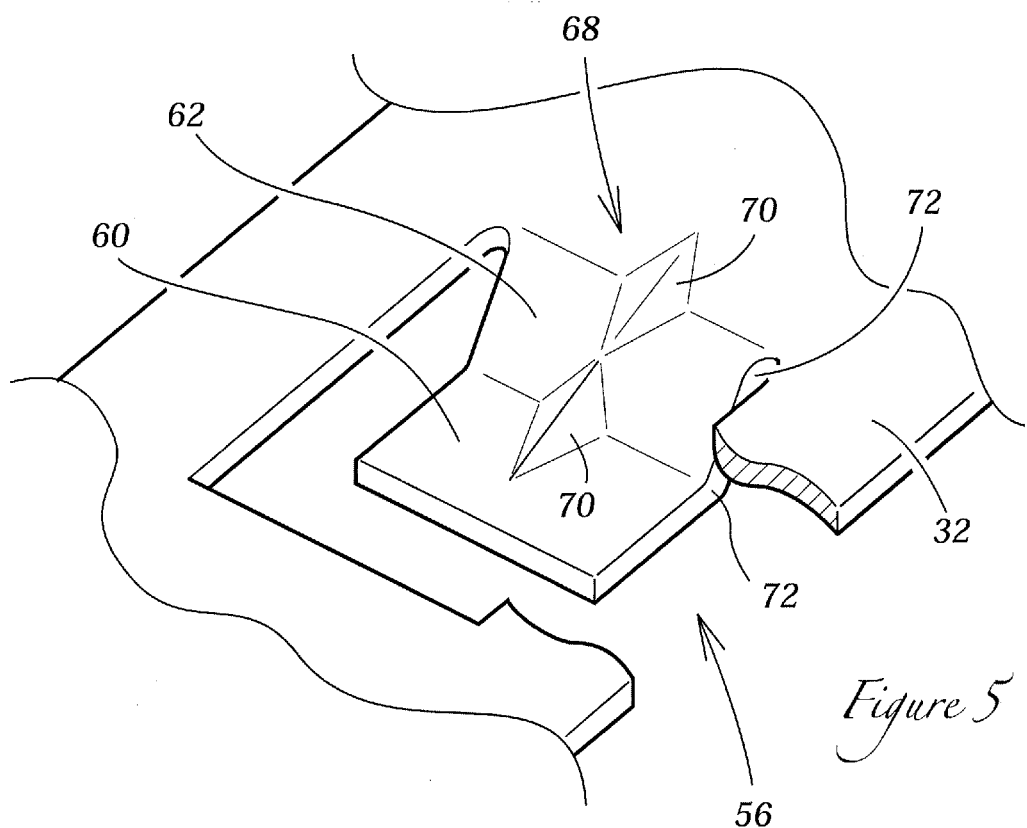
FIGS. 5 and 6 are enlarged portions showing details of alternative embodiments of the tab.
Figure 6:
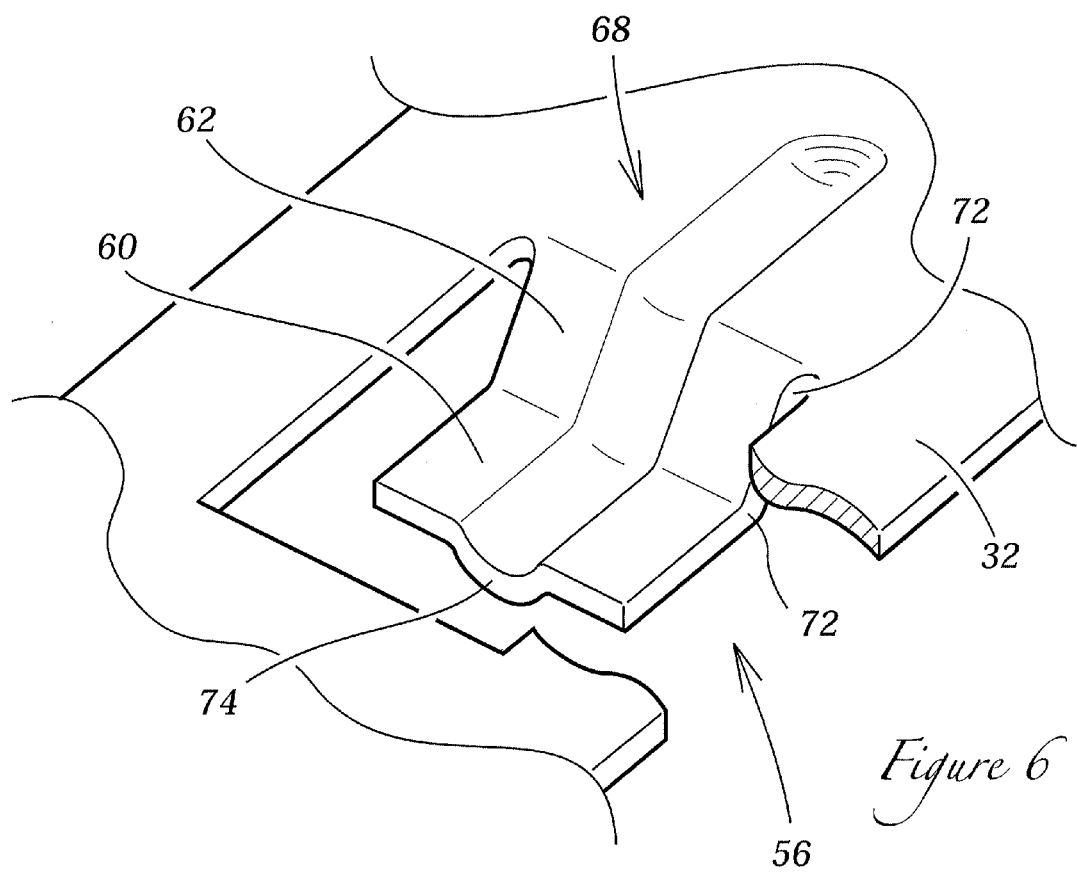

Seen in FIGS. 5 and 6, the tab 56 has been modified to include a reinforcement 68. As illustrated in FIG. 5, the reinforcement 68 is formed in the tab 56 as a pair of darts 70. The darts 70 are formed as displacements of material in the tab 56 and are generally located in the regions where the tab 56 makes a corner 72, which are between the displaced portion 60 and the transition portion 62 and between the transition portion 62 and the body portion of the cross member 32. In FIG. 6, the reinforcement 68 is shown as being in the form as a bead 74. The bead 74 extends along the tab 56 and is therefore formed in the displaced portion 60, the transition portion 62, and the body portion of the cross member, as well as both of the corners 72.

Figure 7:
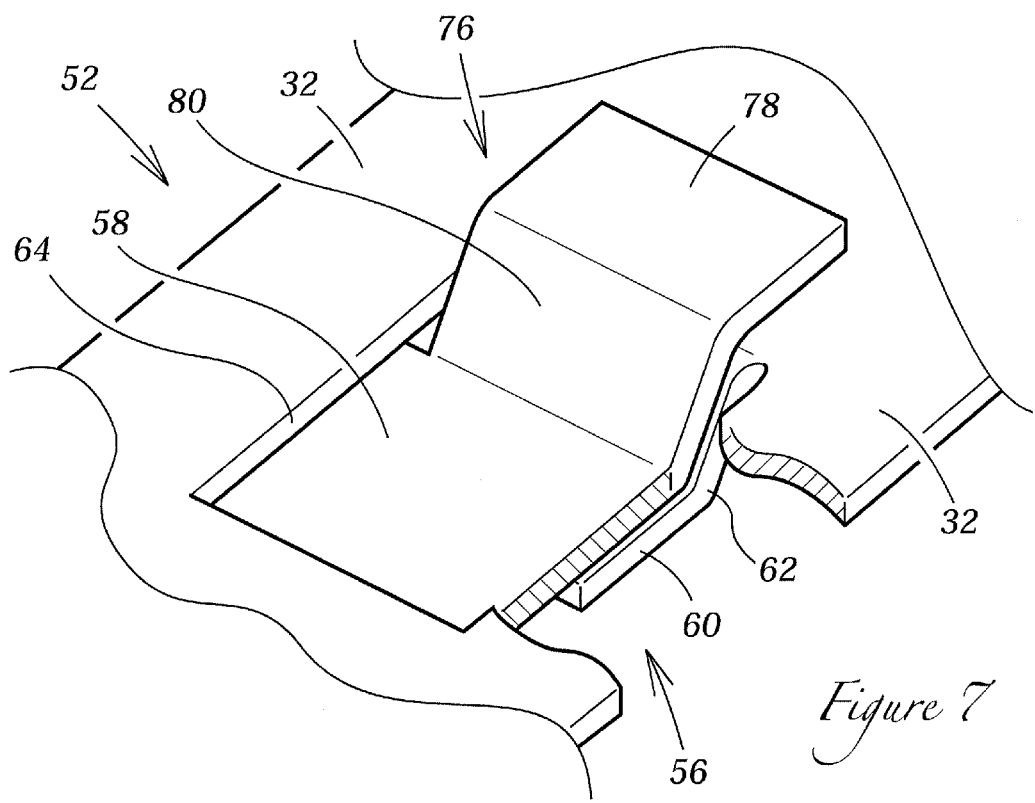
FIG. 7 is an enlarged cross-sectional view of an alternative tab connection according to the principles of the present invention.

In a further embodiment, seen in FIG. 7, the tab connection 52 includes all of the features and elements described in connection with the embodiment shown in FIG. 3, but further includes a second tab 76 formed on the other of the cross member 32 and gusset 34 (illustrated as being on the gusset 34 in the figure and herein after referred to as a gusset tab 76). The gusset tab 76 is formed as an extension off of the end of the tab insert 58 and, similar to the tab 56 on the cross member 32, includes a displaced portion 78 and a transition portion 80 that connects the displaced portion 78 to the end of the tab insert 58. The gusset tab 76 therefore extends through the opening 64 such that at least a portion of the gusset tab 76 overlays part of the body of the cross member 32. Like the tab 56 on the cross member 32, the gusset tab 76 may also include a reinforcement (not shown) to enhance its resistance to bending loads during an impact load.

As a person skilled in the art will readily appreciate, the above description is meant as an illustration of one implementation of the principles this invention. This description is not intended to limit the scope or application of this invention since the invention is susceptible to modification, variation and change, without departing from the spirit of this invention, as defined in the following claims.

We claim:

1. A side impact energy transfer rail for an automotive vehicle, the transfer rail comprising:
    a center cross member having a pair of opposing ends;
    a pair of gussets, each of the gussets being mounted to one of the ends of the cross member, the gussets each having a first gusset end attached to the cross member and a second gusset end configured to be attached to a roof side rail of the vehicle; and
    each of the gussets being secured to the cross member by at least one fastener and at least one additional connection, the at least one fastener being provided along a fastener axis that is defined generally parallel to a longitudinal axis of the vehicle and spaced apart from the first gusset end, the at least one additional connection being positioned laterally offset from the fastener axis toward the first gusset end, and the at least one additional connection including a portion of the cross member in a supportive position beneath a portion of the first gusset end, the additional connection being a tab connection.

2. The transfer rail of claim 1, wherein the tab connection is formed between the gusset and the cross member, the tab connection including a tab and a tab insert, the tab being integral with one of the cross member and the gusset, the tab including a displaced portion and an transition portion, the displaced portion being spaced apart from the one of the cross member and the gusset and being connected by the transition portion to the one of the cross member and the gusset, the tab insert being integral with the other of the cross member and the gusset, and the tab insert being received between the displaced portion and adjacent body portions of the one of the cross member and the gusset.

3. The transfer rail of claim 1, wherein the tab connection includes a tab and a tab insert, and the tab is one piece with one of the cross member and the gusset and the tab insert is one piece with the other of the cross member and the gusset.

4. The transfer rail of claim 3, wherein the tab is formed in the cross member and the tab insert is formed in the gusset.

5. The transfer rail of claim 2, wherein the tab is included with the cross member and the tab insert is included with the gusset.

6. The transfer rail of claim 3, wherein the tab defines an insertion opening through which the tab insert extends, the insertion opening being oriented in a direction facing the other of the cross member and the gusset.

7. The transfer rail of claim 3, wherein the tab includes a reinforcement formed therein as one of a dart and a bead.

8. The transfer rail of claim 3, wherein the tab is a first tab and the tab connection includes a second tab integrally formed in the other of the cross member and the gusset, the second tab extending through an opening defined in one of the cross member and the gusset.

9. The transfer rail of claim 1, wherein the fastener is one of a threaded fastener and a spot weld.

10. A body structure for an automotive vehicle, the body structure comprising:
    a pair of side members, the side members extending longitudinally relative to the vehicle;
    a transfer rail having a center cross member and a pair of gussets, the gussets each having a first gusset end attached to an end of the cross member and a second gusset end attached to one of the side members of the vehicle; and
    each of the gussets being secured to the cross member by at least one fastener and an additional connection formed between the gusset and the cross member, the at least one fastener defining a fastener axis generally parallel to the roof side rail members and the additional connection being positioned laterally offset from the fastener axis, the additional connection being a tab connection including a tab and a tab insert, the tab being integral with one of the cross member and the gusset, the tab further including a displaced portion and an transition portion, the displaced portion being spaced apart from the one of the cross member and the gusset and being connected by the transition portion to the one of the cross member and the gusset, the tab insert being integral with the other of the cross member and the gusset, the tab insert being received between the tab and adjacent portions of the one of the cross member and the gusset.

11. The body structure of claim 10, wherein tab is one piece with the one of the cross member and the gusset and the tab insert is one piece with the other of the cross member and the gusset.

12. The body structure of claim 11, wherein the tab is formed in the cross member and the tab insert is formed in the gusset.

13. The body structure of claim 10, wherein the tab is included with the cross member and the tab insert is included with the gusset.

14. The body structure of claim 10, wherein the tab defines an insertion opening through which the tab insert extends, the insertion opening being oriented in a direction facing the other of the cross member and the gusset.

15. The transfer rail of claim 10, wherein the tab includes a reinforcement formed therein as one of a dart and a bead.

16. The transfer rail of claim 10, wherein the tab is a first tab and the tab connection includes a second tab integrally formed in the other of the cross member and the gusset, the second tab extending through an opening defined in one of the cross member and the gusset.

* * * * *